United States Patent [19]
Taylor et al.

[11] Patent Number: 5,462,086
[45] Date of Patent: Oct. 31, 1995

[54] SELECTOR RELIEF VALVE ASSEMBLY

[76] Inventors: Julian S. Taylor; Christopher F. Rooney, both of 8300 SW. 8th, Oklahoma City, Okla. 73128

[21] Appl. No.: 335,237

[22] Filed: Nov. 7, 1994

[51] Int. Cl.⁶ ................................................. F16K 11/10
[52] U.S. Cl. .......................................... 137/865; 251/250
[58] Field of Search ............................... 137/865, 883, 137/597; 251/83, 250

[56] References Cited

U.S. PATENT DOCUMENTS

| | | | |
|---|---|---|---|
| 3,095,903 | 7/1963 | Jennings | 251/250 X |
| 3,596,679 | 8/1971 | Sugden, Jr. | 137/865 X |
| 4,388,766 | 6/1983 | Sanderson | 137/865 X |
| 4,403,626 | 9/1983 | Paul, Jr. | 137/557 X |
| 4,580,599 | 4/1986 | Dighton | 137/597 |

*Primary Examiner*—John C. Fox
*Attorney, Agent, or Firm*—Robert K. Rhea

[57] ABSTRACT

A dual pressure relief valve selector is formed by a Y-shaped tubular body having an inlet port at its stem position connected with a vessel or a line to be monitored. Each leg of the Y-shaped housing is connected in fluid communicating relation with a safety relief valve. A spring and fluid flow biased open flap valve and valve seat is contained by each leg of the Y-shape adjacent the inlet of the respective relief valve. A pinion journalled by the housing moves a rack to and fro between the flap valves for normally maintaining one of the flap valves in closed position and isolating the relief valve downstream from the closed flap valve.

12 Claims, 2 Drawing Sheets

SELECTOR RELIEF VALVE ASSEMBLY

BACKGROUND OF THE INVENTION

1. Field of the Invention

The present invention relates to dual pressure relief valves and more particularly to a selector valve permitting the operator to switch the pressure being monitored from one relief valve to the other.

In many process industries it is highly desirable to provide dual fluid pressure relief valves in which one valve monitors the fluid pressure while the other pressure is shutoff from the other relief valve. In the event of over pressure blowing the relief valve in operation, that valve may be isolated by switching the fluid pressure to the other relief valve permitting the ruptured valve to be removed or reset.

This invention provides dual relief valves for a fluid pressure system.

2. Description of the Prior Art

It has been common practice to provide dual relief valves for fluid process systems by connecting two relief valves in parallel with a fluid process line in which the outlets of the relief valves are connected in common with a discharge header. Each of the relief valves is provided with an upstream and a downstream fluid shutoff valve to isolate the respective relief valve when its seal fails or needs servicing or testing.

One known selector valve for directing fluid to one or the other of a pair of fluid relief valves features a rotor which includes a stop member interrupting flow to one of the relief valves which must be unseated and then rotated 180° with the rotor to axially position and seat the stop member over the fluid passageway to the ruptured valve.

This invention uses flap valves disclosed in U.S. Pat. No. 3,066,693 issued Dec. 4, 1962 to Taylor for Float Valve For Drill Pipe And The Like. This invention is distinctive over known prior art by providing a Y-shaped deverter body interposed in a fluid flow line having a relief valve connected with the respective leg of the Y-shape and opened and closed by a flap valve respectively movable to a closed or open position by a pinion driven rack for closing one flap valve and simultaneously allowing the opposite spring urged flap valve to be biased to an open position.

SUMMARY OF THE INVENTION

A Y-shaped valve body having a bolt flange stem portion is connected in fluid communication with a vessel or a fluid pressure line to be monitored. A spring or flow pressure urged open flap valve is secured in the open end portion of each leg of the Y-shape opposite its stem, which is connected with a conventional pressure relief valve and can be in common with a discharge line which may discharge directly to atmosphere.

A rack is horizontally interposed between and guided for to and fro movement by axially aligned guide slots supported by the respective flap valve housing. A pinion supported by the Y-shaped body is manually angularly rotated in a selected direction for moving the respective end portion of the rack toward a respective flap valve to close the latter while simultaneously moving from the opposite flap valve allowing it to open.

The principal object of this invention is to provide a selector valve which communicates fluid pressure being monitored to a selected one of a pair of relief valves which permits switching the pressure being monitored from a blown relief valve to the other relief valve without a shutdown of the system while the blown relief valve is being replaced or reset.

DESCRIPTION OF THE PREFERRED EMBODIMENTS

Like characters of reference designate like parts in those figures of the drawings in which they occur.

Figure 1:
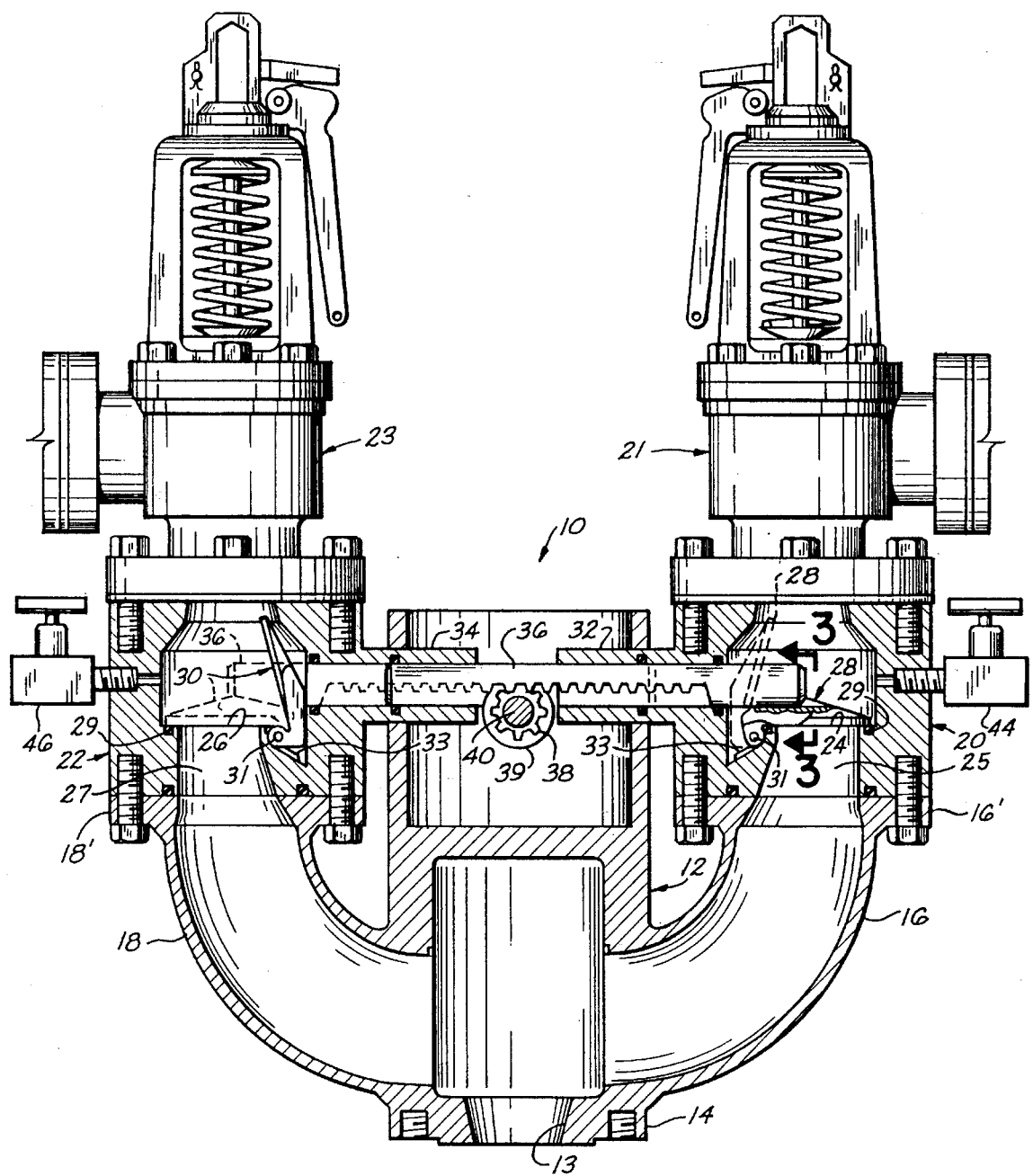
FIG. 1 is a vertical cross sectional view taken substantially along the line 1—1 of FIG. 2.
Figure 2:
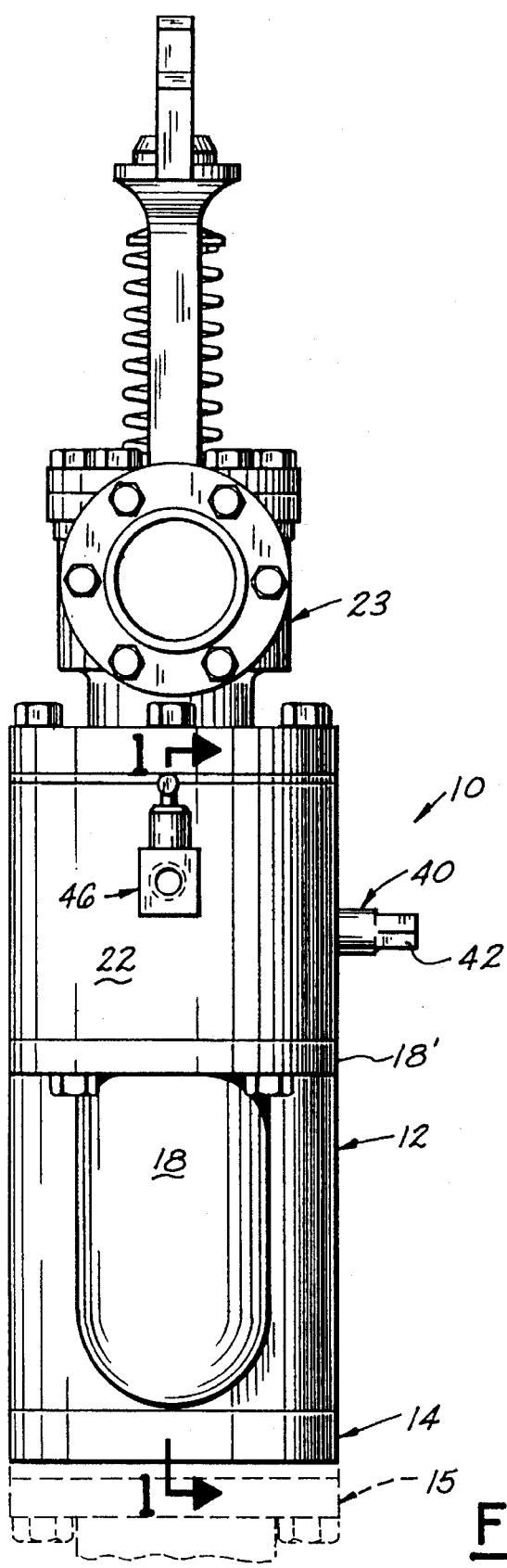
FIG. 2 is a left end elevational view of the selector valve connected with relief valves and illustrating, by dotted lines, its connection with a vessel; and, FIG. 3 is a fragmentary vertical cross sectional view taken substantially along line 3—3 of FIG. 1.

The reference numeral 10 indicates the selector valve as a whole which is substantially Y-shaped (FIG. 1).

The selector valve comprises a valve body 12 having an inlet port 13 surrounded by a bolt flange stem 14 for connection with a cooperating flange 15 on a vessel or line.

The housing includes a pair of opposing arcuate upwardly projecting leg portions 16 and 18 each having a bolt flange 16' and 18', respectively, at its upper end for connection with one end of flap valve housings 20 and 22, each having a central fluid passageway 25 and 27, respectively, communicating with the respective leg. Each of the flap valve housings are provided, intermediate its ends, with a downstream facing annular valve seat 24 and 26, respectively. The respective valve seat supports a metal crush seal or an O-ring 29 which seats and seals with flap valves 28 and 30 pivotally supported in the respective passageway 25 and 27 by pins 31 and normally biased open by springs 33 and/or fluid flow.

Opposite the legs 16 and 18 the flap valve housings are respectively cooperatively connected with the inlet bolt flanges of a pair of relief valves 21 and 23.

Figure 3:
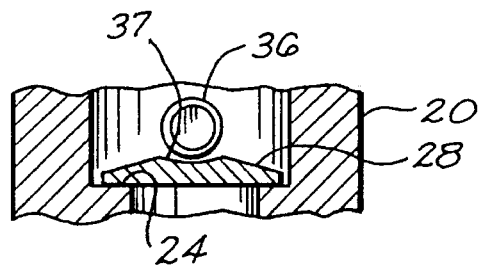

Each of the flap valve housings 20 and 22 have a lateral tubular extension 32 and 34, respectively, projecting toward each other in axial confronting relation for slidably receiving respective end portions of a rack 36 longitudinally moveable toward and away from the respective flap valve 28 and 30 for closing one valve and allowing the other to be spring and/or fluid flow biased open. The respective end portions of the rack slides in a groove 37 (FIG. 3) formed in the surface of the respective flap valve opposite its valve seat contacting surface. The rack 36 is moved by a manually rotated pinion 38 mounted on a shaft 40 journalled by bearings 39 in the selector valve housing 12 and angularly rotated as by a crank or wrench, neither being shown, applied to wrench flats 42 on one outwardly projecting end of the shaft 40. The length of the rack 36 relative to the spacing between the flap valves is dimensioned to allow both flap valves to open when the rack is centered therebetween.

Each of the flap valve housings 20 and 22 are further provided with an access valve 44 and 46 respectively, downstream from the respective flap valve for testing an out of service relief valve 21 or 23, e.g. by applying fluid under pressure through the respective valve 44 or 46.

OPERATION

Assuming the selector valve 10 and relief valves 21 and 23 are installed as described hereinabove with the valve 30 in open position. In the event the relief valve 23 downstream from the open flap valve 30, is opened by excess fluid pressure and subsequently does not reseat when the pressure is reduced, a wrench, not shown, applied to the wrench flats 42 moves the rack 36 to the left, as viewed in FIG. 1, wherein the adjacent end portion of the rack overrides the flap valve 30, closing the latter while simultaneously moving off of and allowing the other flap valve 28 to be spring and fluid biased open, thus, placing the fluid pressure under monitor of the other relief valve 21.

Since the flap valve 30 closes off fluid pressure to the damaged relief valve the latter may be removed or reset without interruption of the process or system being monitored.

Obviously the invention is susceptible to changes or alterations without defeating its practicability. Therefore, we do not wish to be confined to the preferred embodiment shown in the drawings and described herein.

We claim:

1. A selector relief valve assembly, comprising:

a generally Y-shaped tubular body having a stem forming a stem inlet port adapted to be connected in fluid communication with a fluid containing line and having a pair of legs diverging from the stem opposite the inlet port for forming spaced-apart legs having downstream end portions and an outlet port for each leg of said pair of legs opposite the inlet port and a fluid passageway between the inlet .port and respective outlet port;

an annular valve seat in the downstream end portion of each leg passageway of said pair of legs facing the respective outlet port;

a valve supported by each leg of said pair of legs for movement toward and away from the respective valve seat; and, rack and pinion means including a pinion supported by said body and a rack having a predetermined length extending between said pair of legs for movement of said rack toward a selected valve and biasing the latter closed.

2. The valve assembly according to claim 1 in which the length of said rack with respect to the spacing between said valves is such that when one valve is fully closed the other valve is fully open.

3. The valve assembly according to claim 2 in which said valves are flap valves.

4. The valve assembly according to claim 2 in which said valves are normally spring biased open flap valves.

5. The valve assembly according to claim 4 in which the rack and pinion means further includes: guide tube means communicating at one end portion with the passageway of each leg of said pair of legs downstream with respect to the respective valve seat and disposed at their other end portions in spaced axial confrontation between said pair of legs for slidably supporting respective end portions of said rack.

6. The valve assembly according to claim 1 in which the length of said rack, relative to the spacing between said valves, allows both said valves to open when Said rack is centered therebetween.

7. A selector relief valve assembly, comprising:

a generally Y-shaped body having an inlet port adapted to be connected with a fluid conductor and having legs diverging from the inlet port forming fluid passageways and adapted to be respectively connected at their end portion remote from the inlet port with a relief valve;

valve and seat means in each said leg remote end portion for opening or closing the fluid passageway; and, rack and pinion means supported by said body including a rack having a predetermined length slidably extending between said pair of legs for movement toward a selected valve and biasing the latter closed.

8. The valve assembly according to claim 7 in which the length of said rack with respect to the spacing between said valves is such that when one valve is completely closed the other valve is completely open.

9. The valve assembly according to claim 7 in which the length of said rack, relative to the spacing between said valves, allows both said valves to open when said rack is centered therebetween.

10. The valve assembly according to claim 7 in which said valves are flap valves.

11. The valve assembly according to claim 10 in which the rack and pinion means further includes:

guide tube means communicating at one end portion with the passageway of each leg of said pair of legs downstream with respect to the respective valve seat and disposed at their other end portion in spaced axial confrontation between said pair of legs for slidably supporting respective end portions of said rack.

12. The valve assembly according to claim 7 in which said valves are spring biased open flap valves.

* * * * *